E. S. CLAPP.
Scythe Fastening.
No. 204.
Reissued July 8, 1851.
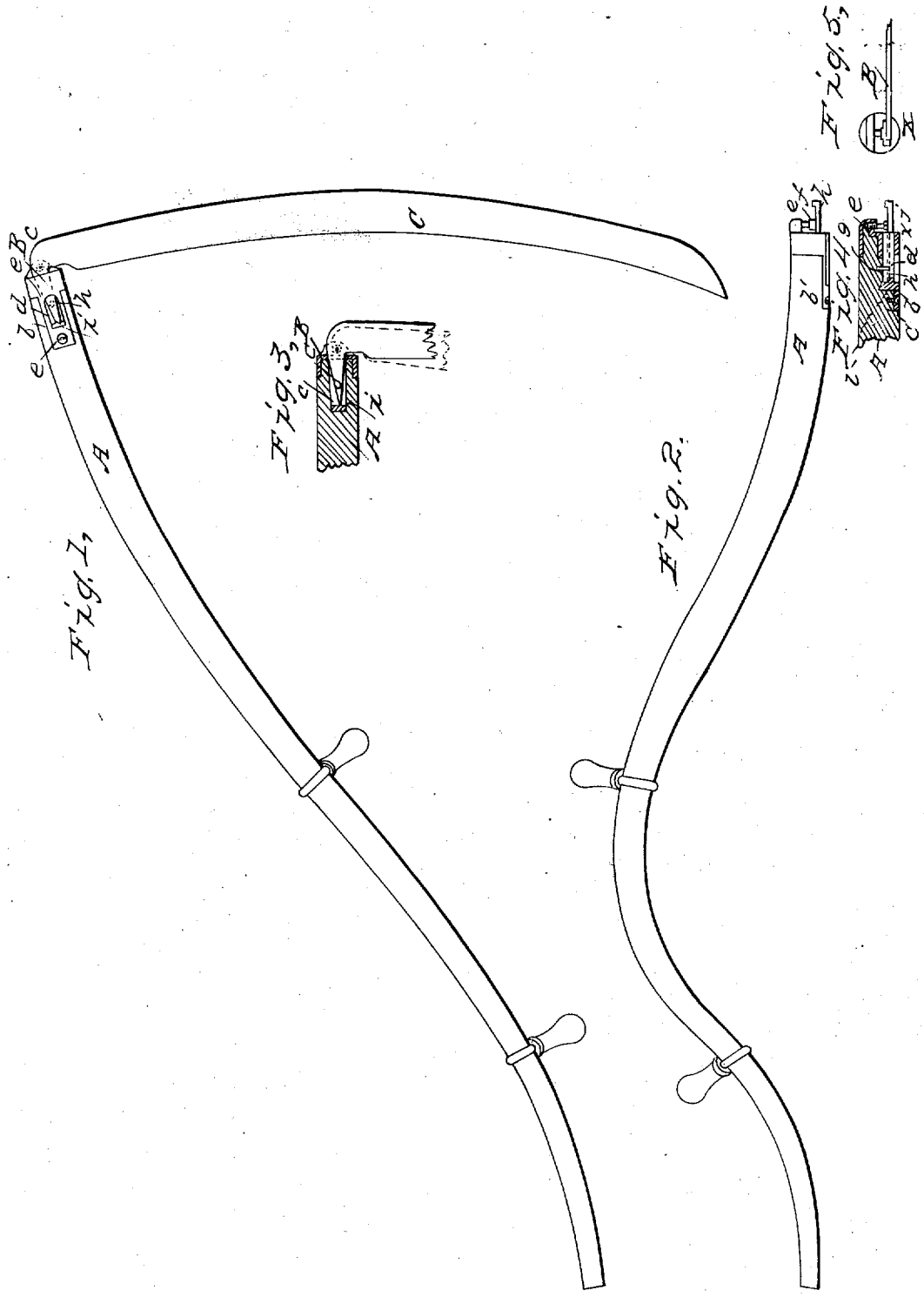
N. PETERS, Photo-Lithographer, Washington, D. C.

UNITED STATES PATENT OFFICE.

E. S. CLAPP, OF MONTAGUE, MASSACHUSETTS.

IMPROVEMENT IN FASTENING SCYTHES TO SNATHS.

Specification forming part of Letters Patent No. 7,984, dated March 18, 1851; Reissue No. 204, dated July 8, 1851.

*To all whom it may concern:*

Be it known that I, E. S. CLAPP, of Montague, in the county of Franklin and State of Massachusetts, have invented certain new and useful Improvements in the Mode of Attaching and Securing the Blades of Scythes to their Snaths; and I do hereby declare that the following is a full, clear, and exact description of the same, reference being had to the accompanying drawings, forming part of this specification, in which—

Figure 1 is a view looking toward the under side of the blade. Fig. 2 is a view looking toward the heel of the blade. Fig. 3 is a section of the end of the snath and its collar, taken in line with the blade. Fig. 4 is another section of the end of the snath and collar, taken transversely to the plane of the blade. Fig. 5 is an end view of the collar.

Similar letters of reference indicate corresponding parts in each of the several figures.

A, Figs. 1 and 2, is the snath, which is of the usual form.

B is a metal cap, which fits tightly on the end of the snath. It is provided with an aperture, *a*, (see Fig. 5,) which is wider than the thickness and longer than the width of the shank of the b'ade. One side of the cap has a strip of metal, *b*, proceeding from it and extending a short distance along the snath, to which it is secured by a screw, *c*. On its end there is a projection, *e*, in which, perpendicular to the plane of the blade, a screw, *f*, is inserted. In the end of the snath there is a recess, *d*, for the purpose of receiving the shank of the scythe, which is inserted through the aperture *a* in the cap B, but does not fit tight in the snath, as a considerable amount of play is allowed for the purpose of adjusting it. At the back of the recess, on the same side as the screw *f*, a screw, *g*, is inserted, standing parallel to *f*, and being always fixed in one position unless the set of the edge is required to be altered. At the bottom of the recess *d* there is a plate, *i*, having a number of notches on its face.

C is the scythe-blade. Its shank *h* is inserted in the snath through the aperture *a*, and the point or tail of it sits in one of the notches in the plate *i*. One side of the shank has a notch in it across the heel at *j*, (see Figs. 3 and 4,) and at this point it rests on the edge *x* of the aperture *a* in the end of the cap B, being held firmly against it by unscrewing the screw *f* from the projection *e* and making it operate upon the chank as if it were a lever, the edge of the hole *a* being its fulcrum. The tail end of the shank is thus forced by the pressure of the screw *f* against the head of the screw *d*, and the shank is clamped or held secure between three bearing-points, one on one side and two on the opposite side. This mode of fastening allows the set of the scythe to be readily altered. The aperture *a'* in the cap being longer than the width, the shank admits of the necessary movements for setting the point of the blade more in or out. The tail or point of the shank can be placed in either of the notches in the plate *i* and the necessary amount of lateral motion given to the blade for the purpose. This will be understood more readily by referring to Fig. 3, where two different positions of the blade are represented. The screw *g*, by being screwed in or out by a screw-driver inserted through the hole in the plate *b* of the cap when the blade is taken out, will cause the set of the edge up or down to be altered. This may be seen in Fig. 4, where the blade is represented in black and red lines in two different positions.

What I claim as my invention, and desire to secure by Letters Patent, is—

1. The mode of attaching and securing the blade of the scythe to the snath, substantially as herein specified—to wit, by clamping its shank between the edge *x* of an aperture, *a*, in the end of a metal cap secured to the snath and two bearings or points, *g* and *f*, on the opposite side of the shank and on opposite sides of the first-named bearing-point, one, *f*, of the two bearings consisting in a screw or its equivalent, for the purpose of giving the necessary pressure to clamp it.

2. The method, substantially as herein described, of setting the edge of the blade more up or down by means of the adjusting-screw *g*, in combination with the edge *x* of the aperture *a*, which forms one of the three bearing-points of the shank.

E. S. CLAPP.

Witnesses:

EDWARD BENTON,
ALMON BRAINARD.